(12) United States Patent
Lichtfers et al.

(10) Patent No.: US 8,361,426 B2
(45) Date of Patent: Jan. 29, 2013

(54) ABSORPTION MEDIUM AND METHOD FOR REMOVING SOUR GASES FROM FLUID STREAMS, IN PARTICULAR FROM FLUE GASES

(75) Inventors: Ute Lichtfers, Karlsruhe (DE); Robin Thiele, Speyer (DE); Susanna Voges, Ludwigshafen (DE); Georg Sieder, Bad Dürkheim (DE); Oliver Spuhl, Mannheim (DE); Hugo Rafael Garcia Andarcia, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/999,387

(22) PCT Filed: Jun. 9, 2009

(86) PCT No.: PCT/EP2009/057101
§ 371 (c)(1),
(2), (4) Date: Dec. 16, 2010

(87) PCT Pub. No.: WO2009/156273
PCT Pub. Date: Dec. 30, 2009

(65) Prior Publication Data
US 2011/0094381 A1   Apr. 28, 2011

(30) Foreign Application Priority Data

Jun. 23, 2008  (EP) ..................... 08158768
Apr. 24, 2009  (EP) ..................... 09158689

(51) Int. Cl.
*B01D 53/40* (2006.01)
*B01D 53/14* (2006.01)
*B01D 53/78* (2006.01)
*B01D 53/96* (2006.01)
*C07D 241/04* (2006.01)
*C07C 211/13* (2006.01)
*C07C 211/14* (2006.01)

(52) U.S. Cl. ..... 423/228; 423/226; 423/235; 423/242.1; 423/242.2; 423/242.7; 544/358; 544/402; 544/404; 564/511; 564/512

(58) Field of Classification Search .................. 423/210, 423/220, 226, 228, 234, 242.1, 242.2, 242.4, 423/242.7, 235; 544/358, 402, 404; 564/511, 564/512
See application file for complete search history.

(56) References Cited

U.S. PATENT DOCUMENTS

| | | | |
|---|---|---|---|
| 4,336,233 A | | 6/1982 | Appl et al. |
| 5,100,635 A | * | 3/1992 | Krishnamurthy et al. ..... 423/235 |
| 6,165,433 A | | 12/2000 | Chakravarti et al. |
| 6,267,939 B1 | | 7/2001 | Gemes et al. |
| 2004/0036055 A1 | | 2/2004 | Asprion et al. |
| 2006/0104877 A1 | * | 5/2006 | Cadours et al. .............. 423/226 |
| 2008/0098892 A1 | | 5/2008 | Asprion et al. |
| 2009/0199711 A1 | | 8/2009 | Asprion et al. |

FOREIGN PATENT DOCUMENTS

| | | | |
|---|---|---|---|
| CA | 2651888 | * | 11/2008 |
| DE | 1544155 | * | 2/1970 |
| EP | 0 647 462 | | 4/1995 |
| EP | 879 631 | | 11/1998 |
| GB | 767317 | | 1/1957 |
| GB | 871754 | | 6/1961 |
| WO | WO-99/04885 | | 2/1999 |
| WO | WO-02/07862 | | 1/2002 |
| WO | WO-2005/087350 | | 9/2005 |
| WO | WO 2007/134994 | * | 11/2007 |
| WO | WO-2007/144372 | | 12/2007 |
| WO | WO-2009/156271 | | 12/2009 |
| WO | WO-2010/100100 | | 9/2010 |

OTHER PUBLICATIONS

Reddy, et al., "Fluor's Econamine FG Plus[SM] Technology—An Enhanced Amine-Based $CO_2$ Capture Process," Second National Conference on Carbon Sequestration, National Energy Technology Laboratory/Department of Energy, Alexandria, VA, May 5-8, 2003.
International Search Report, International Application No. PCT/EP2009/057101, issued Sep. 24, 2010.

English-language translation of the International Search Report, International Application No. PCT/EP2009/057101, dated Mar. 22, 2011.

* cited by examiner

*Primary Examiner* — Daniel C McCracken
*Assistant Examiner* — Daniel Berns
(74) *Attorney, Agent, or Firm* — Connolly Bove Lodge & Hutz LLP (57) ABSTRACT

Absorption medium for acid gases comprising an oligoamine (A) of the general formula (I)

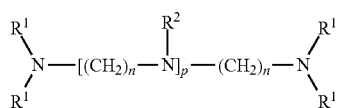

and a piperazine derivative (B) of the general formula (II)

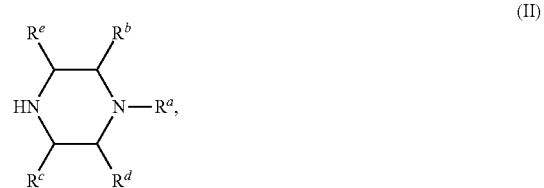

in which the weight ratio of oligoamine (A) to the piperazine derivative (B) is 0.2 to 25, and also process for removing acid gases from a gas stream by contacting the gas stream at a pressure of 0.05 to 10 MPa abs with an aqueous solution of said absorption medium which is brought to and maintained at a temperature of 20 to 80° C.

15 Claims, 2 Drawing Sheets

ABSORPTION MEDIUM AND METHOD FOR REMOVING SOUR GASES FROM FLUID STREAMS, IN PARTICULAR FROM FLUE GASES

CROSS REFERENCE TO RELATED APPLICATIONS

This application is a national stage application under 35 U.S.C. §371 of PCT/EP2009/057101, filed Jun. 9, 2009, which claims benefit to European applications 08158768.5, filed Jun. 23, 2008, and 09158689.1, filed Apr. 24, 2009, respectively, the entire disclosures of which are hereby incorporated by reference.

The present invention relates to an absorption medium for acid gases comprising an oligoamine (A) and a piperazine derivative (B) in which the weight ratio of oligoamine (A) to the piperazine derivative (B) is 0.2 to 25. In addition, the present invention relates to a process for removing acid gases from a gas stream by contacting the gas stream at a pressure of 0.05 to 10 MPa abs with an aqueous solution of said absorption medium heated to and maintained at a temperature of 20 to 80° C.

The removal of acid gases such as, e.g., $CO_2$, $H_2S$, $SO_2$, COS, $CS_2$, HCN or mercaptans, from fluid streams, such as natural gas, refinery gas, synthesis gas, is of importance for differing reasons. Carbon dioxide must be removed from natural gas, for example, since a high carbon dioxide concentration reduces the calorific value of the gas. In addition, carbon dioxide in combination with moisture which is frequently entrained in the fluid streams can lead to corrosion in pipes and fittings. In addition, the content of sulfur compounds in the natural gas must also be reduced by suitable treatment measures, since the sulfur compounds, in the water which is frequently entrained by the natural gas, also form acids which act corrosively. Therefore, for the transport of natural gas in a pipeline, preset limiting values of the sulfur-comprising impurities must be complied with. In addition, numerous sulfur compounds are foul-smelling, even at low concentrations, and, especially sulfur dioxide, toxic.

The removal of carbon dioxide from combustion exhaust gases or flue gases is desirable, in particular for decreasing the emission of carbon dioxide, which is considered to be the main cause of what is termed the greenhouse effect. Flue gases generally have a carbon dioxide partial pressure of 10 to 500 hPa. Customarily these occur at a pressure close to atmospheric pressure. In order to achieve an effective removal of carbon dioxide, the absorption medium must have a high carbon dioxide affinity. The high carbon dioxide affinity, on the other hand, has the effect that, in the regeneration of the absorption medium, the carbon dioxide is generally not completely expelled and the regenerated absorption medium has a carbon dioxide residual loading. Only the difference between the maximum load capacity of the absorption medium and the residual loading of the regenerated absorption medium is available as cycle capacity.

One absorption medium which is particularly approved in practice for removing acid gases from, for example, synthesis gas, natural gas or biogas is described in U.S. Pat. No. 4,336,233. This is an aqueous solution of methyldiethanolamine (MDEA) and piperazine as activator for increasing the absorption rate. The described absorption medium comprises 1.5 to 4.5 mol/l of methyldiethanolamine and 0.05 to 0.8 mol/l of piperazine.

EP-A 0 879 631 describes a process for removing carbon dioxide from a combustion gas by contacting the combustion gas at atmospheric pressure with an aqueous amine solution. The amine solution comprises one secondary amine and one tertiary amine, each at a concentration of 10 to 45% by weight.

U.S. Pat. No. 6,165,433 relates to carbon dioxide removal from a gas stream, the carbon dioxide partial pressure of which is 10 psia (689 hPa) or less using an absorption medium which comprises water, 5 to 35% by weight of a fast-reaction-rate amine and 5 to 50% by weight of a slow-reaction-rate amine. Fast-reaction-rate amines are monoethanolamine, diethanolamine, piperazine and diisopropanolamine. Slow-reaction-rate amines are methyldiethanolamine, triethanolamine, and sterically hindered amines such as 2-amino-2-methyl-1-propanol.

WO 2005/087,350 discloses a process for removing carbon dioxide from flue gases using a liquid absorption medium which comprises a tertiary aliphatic amine and an activator such as 3-methylaminopropylamine. The tertiary aliphatic amine should have a reaction enthalpy $\Delta_R H$ of the protonation reaction which is greater than that of methyldiethanolamine. The absorption medium comprises 20 to 60% by weight of tertiary aliphatic amine and 1 to 10% by weight of activator.

Frequently, alkanolamines are used for removing carbon dioxide from flue gases.

WO 02/007,862 describes a process and an absorption medium for removing acid gases from a fluid stream. The absorption medium comprises a tertiary aliphatic alkanolamine and an activator such as 3-methylaminopropylamine. The treatment of fluid streams having low carbon dioxide partial pressures is not described.

WO 2007/144,372 describes a process for removing carbon dioxide from flue gases by contacting them with an aqueous solution of a tertiary aliphatic alkanolamine and an N-alkyldiamine which is specified in more detail. As preferred tertiary aliphatic alkanolamines, methyldiethanolamine, methyldiisopropanolamine and butyldiethanolamine are mentioned. As preferred activator, in particular 3-methylaminopropylamine is mentioned.

In particular, in industrial processes for removing carbon dioxide from flue gases, preferably use is made of monoethanolamine (MEA) as absorption medium. Thus, for instance, Satish Reddy et al. of Fluor Corporation, in an abstract for the Second National Conference on Carbon Sequestration of the National Energy Technology Laboratory/Department of Energy, Alexandria, Va., U.S.A., which took place from the 5th to 8th of May 2003 with the title "Fluor's Econamine FG Plus$^{SM}$ Technology—An enhanced amine-based $CO_2$ capture process", describe the removal of carbon dioxide from flue gases using an absorption medium comprising monoethanolamine and a secret inhibitor. The latter suppresses the degeneration of monoethanolamine due to the presence of oxygen and at the same time protects the plant from corrosion. This process, at the time of publication, was already being used in 23 commercially operated plants.

Technologies based on monoethanolamine are distinguished by a high reactivity between the amine and carbon dioxide. However, the high reactivity is disadvantageously accompanied by a high absorption enthalpy and a high energy requirement for regeneration. Other alkanolamines such as, for instance, diethanolamine or methyldiethanolamine, which have a lower energy requirement for regeneration, are suitable only with restrictions for this separation task owing to their slower reaction kinetics between carbon dioxide and amine.

WO 99/004,885 teaches the removal of acid gases from a gas stream by contacting them with an aqueous solution of an oligoamine which is specified in more detail which has a concentration of 20 to 60% by weight and preferably comprises an alkali metal compound or an aliphatic or cycloaliphatic mono- or diamine as activator. Activators which are mentioned by name are sodium hydroxide, sodium hydrogencarbonate, triethylenediamine, dicyclohexylamine, N-ethylcyclohexylamine and N,N-dimethylcyclohexylamine. A disadvantage of the use of sodium hydroxide and sodium hydrogencarbonate as activator is the significantly increased energy requirement in regeneration. A disadvantage of the use of triethylenediamine is its slow reaction kinetics which are accompanied by a relatively long residence time or a larger exchanger area in absorption. A disadvantage of the use of dicyclohexylamine, N-ethylcyclohexylamine and N,N-dimethylcyclohexylamine is their restricted miscibility with water which limits the flexibility in adaptation of the activator content.

The object of the present invention was to find an absorption medium for acid gases and a process for removing acid gases from fluid streams which does not have said disadvantages of the prior art, or has them only to a reduced extent, and which enables, in particular compared with the known processes using monoethanolamine, a higher cycle capacity and a lower regeneration requirement and simultaneously has sufficiently rapid reaction kinetics between carbon dioxide and the amine.

DETAILED DESCRIPTION OF THE INVENTION

Accordingly, an absorption medium for acid gases has been found which comprises
(A) an oligoamine of the general formula (I)

in which
$R^1$ is hydrogen or $C_1$- to $C_3$-alkyl,
$R^2$ is hydrogen or $C_1$- to $C_3$-alkyl,
n is 2 to 6, and
p is 1 to 3; and
(B) a piperazine derivative of the general formula (II)

in which
$R^a$ is hydrogen, $C_1$- to $C_3$-alkyl, —$CH_2CH_2OH$ or —$(CH_2)_mNH_2$ where m is 1 to 3, and
$R^b$ is hydrogen, $C_1$- to $C_3$-alkyl or —$(CH_2)_nNH_2$ where n is 1 to 3, $R^c$ is hydrogen, $C_1$- to $C_3$-alkyl or —$(CH_2)_oNH_2$ where o is 1 to 3,
$R^d$ is hydrogen, $C_1$- to $C_3$-alkyl or —$(CH_2)_pNH_2$ where p is 1 to 3, and
$R^e$ is hydrogen, $C_1$- to $C_3$-alkyl or —$(CH_2)_qNH_2$ where q is 1 to 3,
wherein the weight ratio of oligoamine (A) to the piperazine derivative (B)

m[oligoamine (A)]/m[piperazine derivative (B)]

is 0.2 to 25.

Examples of suitable oligoamines (A) which may be mentioned are diethylenetriamine, bis(3-methylaminopropyl)methylamine, dimethyldipropylenetriamine, dipropylenetriamine, N,N',N"-trimethylbis(hexamethylene)triamines and bis(3-dimethylaminopropyl)amine. Preference is given to an oligoamine (A) of the general formula (I) in which $R^1$ is hydrogen or methyl, $R^2$ is hydrogen or methyl, n is 2 or 3, and p is 1. Particular preference is given to diethylenetriamine, bis(3-methylaminopropyl)methylamine, dimethyldipropylenetriamine, dipropylenetriamine, and bis(3-dimethylaminopropyl)amine, in particular bis(3-dimethylaminopropyl)amine ($R^1$ is methyl, $R^2$ is hydrogen, n is 3 and p is 1).

Preference is given to a piperazine derivative (B) of the general formula (II) in which
$R^a$ is hydrogen, methyl, ethyl, —$CH_2CH_2OH$ or —$CH_2CH_2NH_2$.
$R^b$ is hydrogen or methyl,
$R^c$ is hydrogen or methyl, $R^d$ is hydrogen or methyl, and
$R^e$ is hydrogen or methyl.

As particularly preferred piperazine derivatives (B), mention may be made of piperazine, N-hydroxyethylpiperazine, N-aminoethylpiperazine, 2-methylpiperazine and 2,5-dimethylpiperazine. Very particular preference is given to piperazine ($R^a$ to $R^e$ are hydrogen).

The weight ratio of oligoamine (A) to the piperazine derivative (B)

m[oligoamine (A)]/m[piperazine derivative (B)]

in the absorption medium according to the invention is 0.2 to 25, preferably 0.2 to 4, and particularly preferably 0.3 to 2.

On the basis of the total amount of the absorption medium, the concentration of oligoamine (A) plus piperazine derivative (B) is particularly advantageously 10 to 60% by weight, and in particular 20 to 50% by weight.

The concentration of oligoamine (A) is preferably 1 to 20% by weight, particularly preferably 1 to 18% by weight, and very particularly preferably 10 to 18% by weight, based on the total amount of the absorption medium.

Particularly advantageously, the absorption medium comprises in addition water, and the weight ratio of the sum of oligoamine (A) plus piperazine derivative (B) to water

{m[oligoamine (A)]+m[piperazine derivative (B)]}/m[water]

is preferably 0.11 to 1.5 and particularly preferably 0.25 to 1.

The absorption medium can in addition additionally comprise physical solvents. A physical solvent is taken to mean a solvent which enters into only a relatively weak interaction with the acid gas. Examples of suitable physical absorption media which are also customary in practice are, for instance, cyclotetramethylene sulfone (sulfolane) and derivatives thereof, aliphatic acid amides (e.g. acetylmorpholine, N-formylmorpholine), N-alkylated pyrrolidones and piperidones (e.g. N-methylpyrrolidone), propylene carbonate, methanol or dialkyl ethers of polyethylene glycols.

In addition, a process has been found for removing acid gases from a gas stream by contacting the gas stream at a pressure of 0.05 to 10 MPa with a liquid absorption medium which is brought to and maintained at a temperature of 20 to 80° C., which comprises using as liquid absorption medium an absorption medium which comprises (A) an oligoamine of the general formula (I)

(I)

in which
$R^1$ is hydrogen or $C_1$- to $C_3$-alkyl,
$R^2$ is hydrogen or $C_1$- to $C_3$-alkyl,
n is 2 to 6, and
p is 1 to 3; and
(B) a piperazine derivative of the general formula (II)

(II)

in which
$R^a$ is hydrogen, $C_1$- to $C_3$-alkyl, —$CH_2CH_2OH$ or —$(CH_2)_mNH_2$ where m is 1 to 3, and
$R^b$ is hydrogen, $C_1$- to $C_3$-alkyl or —$(CH_2)_nNH_2$ where n is 1 to 3,
$R^c$ is hydrogen, $C_1$- to $C_3$alkyl or —$(CH_2)_oNH_2$ where o is 1 to 3,
$R^d$ is hydrogen, $C_1$- to $C_3$-alkyl or —$(CH_2)_pNH_2$ where p is 1 to 3, and
$R^e$ is hydrogen, $C_1$- to $C_3$-alkyl or —$(CH_2)_qNH_2$ where q is 1 to 3, and
(C) water
wherein the weight ratio of oligoamine (A) to the piperazine derivative (B)

m[oligoamine (A)]/m[piperazine derivative (B)]

is 0.2 to 25 and the weight ratio of the sum of oligoamine (A) plus piperazine derivative (B) to water {m[oligoamine (A)]+m[piperazine derivative (B)]}/m[water]

is 0.11 to 1.5.

It is preferred to use in the process according to the invention the preferred absorption media mentioned in the description of the absorption medium.

The absorption of the acid gas proceeds in this case by contacting the gas stream which is to be purified with the liquid absorption medium in a suitable device. Suitable devices comprise at least one scrubbing column which can be designed, for example, as a dumped-bed packed column, arranged packing column or tray column and/or other absorbers such as, for example, a membrane contactor, a radial flow scrubber, a jet scrubber, a venturi scrubber or a rotary spray scrubber. However, the gas stream is treated with the absorption medium preferably in a scrubbing column. This is particularly advantageously operated in countercurrent flow. The gas stream in this case is generally fed into the lower region of the column and the absorption medium into the upper region of the column.

The contacting in the process according to the invention proceeds at a pressure of 0.05 to 10 MPa abs. The liquid absorption medium in this case is brought to and maintained at a temperature of 20 to 80° C., preferably with respect to the lower limit, to a temperature of greater than or equal to 30° C., and with respect to the upper limit to a temperature of less than or equal to 60° C. The gas on entry into the separation device generally has a temperature of 20 to 80° C., preferably 30 to 60° C.

In an advantageous embodiment, the acid gas is removed in a scrubbing column operated in countercurrent flow, in which, in the interior, a discontinuous liquid phase forms, in the presence of activated carbon that is present in the interior of the scrubbing column. The scrubbing column to be used in addition comprises the customarily used internals such as, for example, random packing elements or ordered packings. The activated carbon has a carbon content preferably of greater than 90% by weight and a BET surface area of 300 to 2000 $m^2/g$. The concentration thereof is generally 1 to 2000 g of activated carbon per $m^3$ volume of the scrubbing column. The activated carbon can be fed in various ways. In a preferred embodiment, it is suspended in the liquid absorption medium. In this case its particle size is preferably in the range from 0.1 to 1000 μm, particularly preferably 0.1 to 50 μm. Based on the liquid absorption medium, the concentration of the suspended activated carbon is preferably 0.01 to 20 kg per $m^3$, particularly preferably 1 to 10 kg per $m^3$. In another preferred embodiment, it is applied in a spatially fixed form within the scrubbing column. In this case the activated carbon is situated, for example, in fixed liquid-permeable and gas-permeable pockets (for instance in the form of activated carbon pellets) or in the form of activated carbon-coated packings or random packing elements fixed in the scrubbing column. Based on the volume of the scrubbing column, the concentration of the fixed activated carbon is preferably 1 g to 2 kg per $m^3$, particularly preferably 100 g to 1 kg per $m^3$. Owing to the presence of activated carbon, the absorption rate of the liquid absorption medium is increased, which leads to a still more effective process procedure. Further details on using activated carbon in the absorption of acid gases in aqueous alkaline absorption media are described in the European priority publication having the application number EP 09 154 427.0.

The acid gas can be liberated from the absorption medium which is loaded with the acid gas in a regeneration step, wherein a regenerated absorption medium is obtained. In the regeneration step the loading of the absorption medium is decreased and the resultant regenerated absorption medium is preferably subsequently recirculated to the absorption step.

Generally, the loaded absorption medium is regenerated by heating (for example to 70 to 110° C.), by expansion and/or by stripping with an inert fluid, or a combination of two or all three of said measures. An inert fluid is taken to mean a gas which does not react chemically either with the absorption medium or with the acid gas and also does not dissolve in the absorption medium, or dissolves at most to an insignificant extent. Suitable inert fluids which may be mentioned are, for example, nitrogen, water vapor or air.

Generally, the loaded absorption medium is heated for regeneration and the liberated acid gas is separated off, for example in a desorption column. Before the regenerated absorption medium is reintroduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. By means of the heat exchange the loaded absorption medium is brought to a higher temperature and so in the regeneration step a lower energy input is required. By means of the heat exchange, possibly, a partial regeneration of the loaded absorption medium can also already proceed with liberation of acid gas. The resultant gas-liquid mixed-phase stream is then passed in this case into a phase separation vessel from which the acid gas is taken off. The liquid phase, for complete regeneration of the absorption medium, is passed into the desorption column.

As gas streams from which the acid gases are to be removed, use can be made of in principle all natural and synthetic, oxygen-comprising and oxygen-free gas streams such as, for example, natural gas, refinery gases, synthesis gases, biogases or flue gases. The process according to the invention proceeds, when natural gases are used, preferably at a pressure of 3 to 10 MPa abs, when refinery gases are used, preferably at a pressure of 0.05 to 10 MPa abs, when synthesis gases are used preferably at a pressure of 1.5 to 6 MPa abs, and when biogases or flue gases are used, preferably at a pressure of 0.05 to 0.5 MPa abs.

Very particularly preferably, the process according to the invention is the removal of carbon dioxide from oxygen-comprising gas streams. These comprise preferably 0.1 to 21% by volume of oxygen. Preferred oxygen-comprising gas streams which may be mentioned, in particular, are combustion gases or flue gases which are obtained by the combustion of organic substances;
gases from the composting or storage of organic substances, including organic waste materials; and
gases from the bacterial decomposition of organic substances.

Acid gases are taken to mean compounds which occur in the gaseous state under the available conditions in the gas stream which is to be purified and, in aqueous solution, have a pH of <7. Typical acid gases are, for example, carbon dioxide ($CO_2$), hydrogen sulfide ($H_2S$), sulfur dioxide ($SO_2$), carbonyl sulfide (COS), carbon disulfide ($CS_2$), hydrogen cyanide (HCN) and mercaptans (RSH). The process according to the invention removes preferably carbon dioxide and hydrogen sulfide, and particularly preferably carbon dioxide. The carbon dioxide concentration in the gas stream preferably used is therefore preferably 0.1 to 50% by volume.

Generally, the preferred gas streams comprise less than 100 mg/m$^3$ (S.T.P.) of sulfur dioxide and preferably less than 50 mg/m$^3$ (S.T.P.) of sulfur dioxide. In addition the preferred gas streams generally comprise less than 100 mg/m$^3$ (S.T.P.) of nitrogen oxides, and preferably less than 50 mg/m$^3$ (S.T.P.) of nitrogen oxides.

Hereinafter, by way of example and without being restrictive, a possible procedure in the removal of carbon dioxide from flue gases using the process according to the invention is described. Before the absorption of carbon dioxide according to the invention, the flue gas is preferably subjected to a scrubbing with an aqueous liquid, in particular with water, in order to cool and moisten (quench) the flue gas. During this scrubbing, dusts or gaseous impurities such as sulfur dioxide can also be removed.

Figure 1:
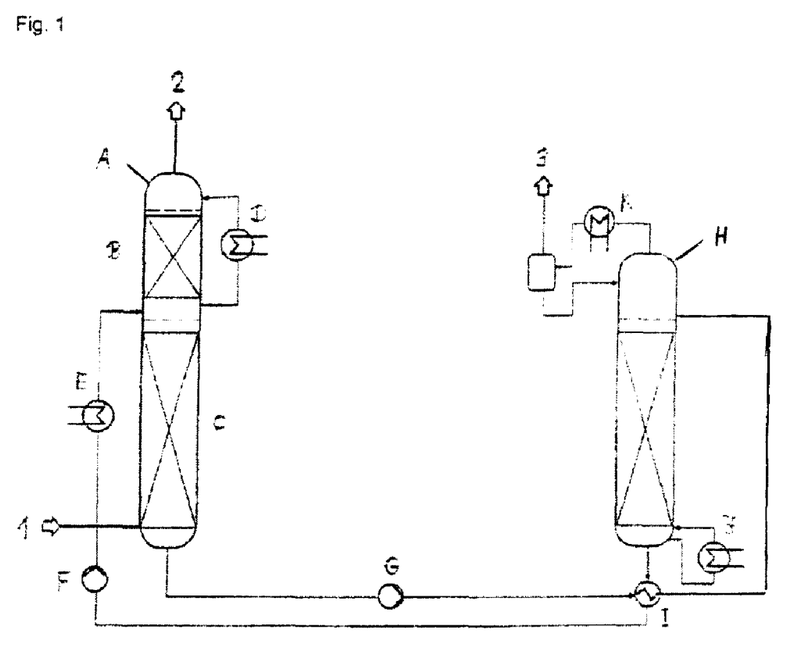
FIG. 1 shows a schematic drawing of an exemplary plant suitable for carrying out the process according to the invention.

The pretreated flue gas is then fed to the actual carbon dioxide removal. FIG. 1 shows in this context a schematic drawing of a plant suitable for carrying out the process according to the invention. Therein the symbols hereinafter have the following meanings:

1=flue gas
2=flue gas depleted in carbon dioxide
3=separated carbon dioxide
A=absorption column
B=water scrubbing
C=absorption
D=cooler
E=cooler
F=pump
G=pump
H=desorption column
I=heat exchanger
J=evaporator (reboiler)
K=condenser According to FIG. 1, flue gas 1 is passed into the lower part of the absorption column A and brought into contact with the absorption medium in countercurrent flow. The flue gas depleted in carbon dioxide is further scrubbed with water in the upper part of the absorption column and passed out of the column overhead as stream 2. The absorption medium which is loaded with carbon dioxide is withdrawn at the bottom of the absorption column A and fed into the desorption column H via the pump G and the heat exchanger I. In the lower part of the desorption column, the loaded absorption medium is heated via the evaporator J. By means of the temperature elevation some of the absorbed carbon dioxide converts back into the gas phase. This is removed at the top of the desorption column H and cooled in the condenser K. Absorption medium which is condensed out is recirculated overhead. The gaseous carbon dioxide is withdrawn as stream 3. The regenerated absorption medium is recirculated back to the absorption column A via the pump F and the cooler E.

The absorption medium according to the invention surprisingly exhibits very balanced properties with respect to the absorption rate which is astonishingly very high and with respect to the energy requirement for regeneration which is astonishingly very low. Therefore, owing to the high absorption rate the use of a relatively small absorption column is possible, since a smaller exchange area or a shorter residence time is absolutely sufficient. Likewise, the evaporator (reboiler) for the desorption column can also be designed so as to be smaller since less energy is required for regenerating the absorption medium. By means of the high absorption rate, by means of the absorption medium according to the invention, a high cycle capacity can also be achieved.

EXAMPLES

Example 1

Relative Cycle Capacity and Relative Steam Requirement for Regeneration in the Case of Absorption Media According to the Invention and Not According to the Invention For determination of the carbon dioxide cycle capacity and the regeneration requirement, laboratory experiments were carried out using various absorption media loaded with carbon dioxide. As comparison base, 30% by weight of monoethanolamine (MEA) in water was used. The absorption medium according to the invention comprised 15% by weight of bis(3-dimethylaminopropyl)amine (bisDMAPA) and 15% by weight of piperazine.

For determination of the relative cycle capacity and estimation of the relative steam requirement for regeneration of the absorption medium, the equilibrium loadings of carbon dioxide in the absorption medium were determined as a function of carbon dioxide partial pressure at 40° C. (for the absorber bottom) and at 120° C. (for the desorber bottom). These measurements were carried out for all systems listed in Table 1. For determination of the equilibrium loading, a glass pressure vessel having a volume of approximately 100 cm$^3$ was used. In this, a defined amount of the absorption medium was charged, the vessel was evacuated and at constant temperature carbon dioxide was added stepwise via a defined gas volume. The amount of carbon dioxide dissolved in the liquid phase was calculated taking into account the gas space correction due to the overlying gas phase.

The following assumptions were made for estimating the cycle capacity of the absorption medium:

1. The absorber is charged at a total pressure of 1 bar with a carbon dioxide-comprising flue gas having a carbon dioxide partial pressure of 130 hPa (corresponding approximately to 13% by volume of carbon dioxide in the flue gas at atmospheric pressure).
2. In the absorber bottom a temperature of 40° C. prevails.
3. During the regeneration in the desorber bottom a temperature of 120° C. prevails.
4. In the absorber bottom an equilibrium state is achieved. The carbon dioxide equilibrium partial pressure is therefore equal to the feed gas partial pressure of 130 hPa.
5. During the desorption a carbon dioxide partial pressure of 100 hPa prevails in the desorber bottom.
6. During the desorption an equilibrium state is achieved.

The capacity of the absorption medium was determined from the loading (in m$^3$ (S.T.P.) of carbon dioxide/t of absorption medium) at the point of intersection of the 40° C. equilibrium curve with the line of constant feed gas carbon dioxide partial pressure of 13 kPa (loaded solution at the absorber bottom in equilibrium) and from the loading at the point of intersection of the 120° C. equilibrium curve with the line of constant partial pressure of 100 hPa (regenerated solution at the desorber bottom in equilibrium). The difference between the two loadings is the cycle capacity of the respective solvent. A high capacity means that less solvent needs to be circulated and therefore the apparatuses such as, for example, pumps, heat exchangers and also piping can be dimensioned so as to be smaller. In addition, the circulation rate also affects the energy required for regeneration.

A further index of the application properties of an absorption medium is the gradient of the operating lines in the McCabe-Thiele diagram of the desorber. For the conditions in the bottom of the desorber, the operating line is generally very close to the equilibrium line, and so the gradient of the equilibrium curve can be considered to be approximately equal to the gradient of the operating lines. At a constant liquid loading, for regeneration of an absorption medium having a high gradient of the equilibrium curve, a lower amount of stripping steam is required. The energy requirement for generating the stripping steam is an important contributor to the total energy requirement of the carbon dioxide absorption process.

Expediently, the reciprocal value of the gradient is reported, since this is directly proportional to the amount of steam required by kilogram of absorption medium. If the reciprocal value is divided by the capacity of the absorption medium, this gives a comparison value which directly enables a relative statement on the required amount of steam per amount of carbon dioxide absorbed.

In Table 1, the values of the relative cycle capacity and the relative steam requirement, normalized to MEA, are shown for the absorption medium according to the invention. In comparison with 30% by weight of MEA, the relative cycle capacity increases to 128% when 15% by weight of bisDMAPA+15% by weight of piperazine are used. The relative steam requirement reduces significantly to 68%, which is an enormous potential savings in industrial application.

Example 2

Relative Absorption Rates for Absorption Media According to the Invention and Not According to the Invention For determination of the mass transport rate of carbon dioxide from the gas stream into the absorption medium, measurements were carried out in a double stirred cell. The mass transport rate, in the case of reactive absorption, is composed both of the physical mass transport and the reaction kinetics between the absorption medium and the carbon dioxide. These two parameters can be measured as a summary parameter in the double stirred cell. Comparison bases used were 31.2% by weight of monoethanolamine (MEA) in water and also 30% by weight of bis(3-dimethylaminopropyl)amine (bisDMAPA) in water. The absorption media according to the invention comprised 15 to 28.6% by weight of bisDMAPA and 1.4 to 15% by weight of piperazine.

Figure 2:
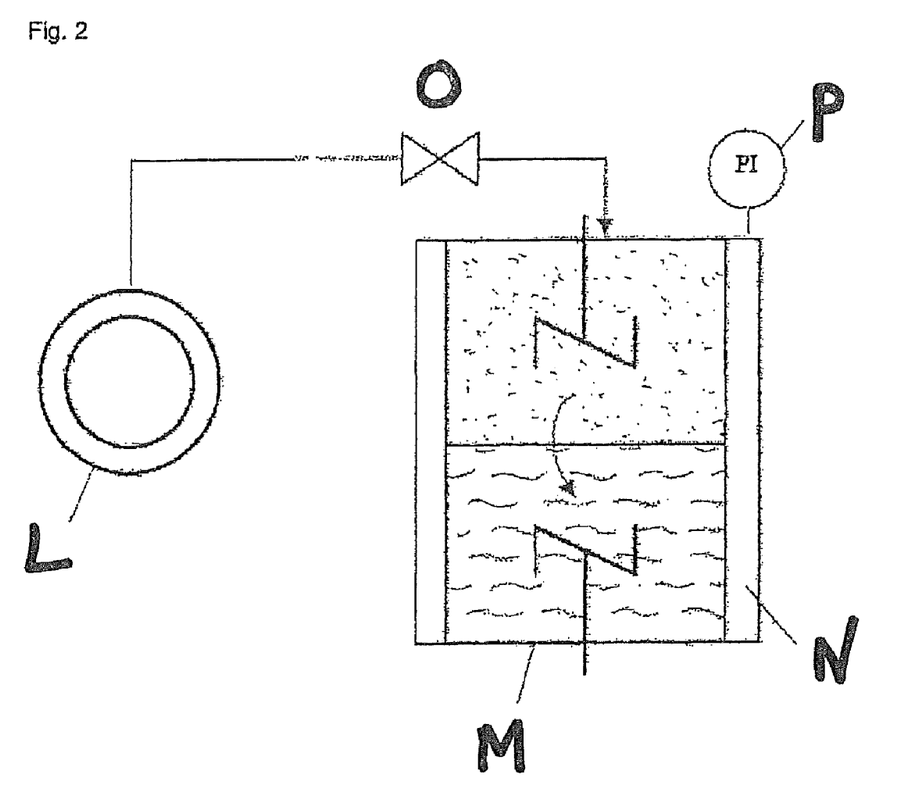
FIG. 2 shows a schematic drawing of a double stirred cell.

FIG. 2 shows a schematic drawing of the double stirred cell having the following elements:
L=carbon dioxide reservoir
M=double stirred cell
N=thermostating
O=metering valve
P=pressure meter The double stirred cell had an internal diameter of 85 mm and a volume of 509 ml. The cell was thermostated to 50° C. during the experiments. For mixing of the gas and liquid phases, the cell was equipped with two agitators according to the schematic drawing. Before the start of the experiment the double stirred cell was evacuated. A defined volume of the degassed absorption medium was transported into the doubled stirred cell and thermostated to 50° C. The agitators were already turned on during heating up of the unloaded absorption medium. The agitator speed was selected such that a planar phase interface is established between the liquid phase and the gas phase. Wave formation of the phase interface must be avoided, since as a result no defined phase interface would be present. After the desired experimental temperature was reached, carbon dioxide was introduced into the reactor via a control valve. The volumetric flow rate was controlled in such a manner that in the double stirred cell, during the experiment, a constant pressure of 50 hPa abs (equivalent to carbon dioxide partial pressure) prevailed. With increasing experimental time, the volumetric flow rate of carbon dioxide decreased, since the absorption medium became saturated with time and therefore the absorption rate decreased. The volumetric flow rate of carbon dioxide which flowed into the double stirred cell was recorded over the entire experimental period. The end of the experiment was reached as soon as carbon dioxide no longer flowed into the double stirred cell. The absorption medium at the end of the experiment was virtually in the equilibrium state.

For evaluation of the experiments, the absorption rate in mole of $CO_2$/(m$^3$ of absorption medium·min) was determined as a function of the loading of the absorption medium. The absorption rate was calculated from the recorded volumetric flow rate of carbon dioxide and the volume of absorption medium charged. The loading was determined from the accumulated amount of carbon dioxide which was fed to the double stirred cell and the charged mass of absorption medium.

Table 2 shows the relative absorption rates of various absorption media at a loading with 10 and 20 m³ (S.T.P.) of $CO_2$/t normalized to bisDMAPA.

In comparison with 30% by weight of bisDMAPA, the relative absorption rate at a loading of 10 m³ (S.T.P.) of $CO_2$ per t of absorption medium increases to 269% when 15% by weight of bisDMAPA+15% by weight of piperazine is used. At a loading of 20 m³ (S.T.P.) of $CO_2$ per t of absorption medium, the relative absorption rate in the case of said amine mixture increases to 366%. Even in the case of an amine mixture having only 1.4% by weight of piperazine and 28.6% by weight of bisDMAPA, the relative absorption rates are 145% (10 m³ (S.T.P.) of $CO_2$ per t of absorption medium) and 182% (20 m³ (S.T.P.) of $CO_2$ per t of absorption medium). The carbon dioxide absorption rate in the bisDMAPA/piperazine mixture is therefore up to three times higher than when pure bisDMAPA is used in the same overall concentration of 30% by weight of amine in aqueous solution.

In contrast, the aqueous solution of 31.2% by weight of MEA shows the highest relative absorption rates of 378% in the case of a loading of 10 m³ (S.T.P.) of $CO_2$ per t of absorption medium and 541% in the case of a loading of 20 m³ (S.T.P.) of $CO_2$ per t of absorption medium. However, it must be taken into account here that according to example 1 the use of a pure MEA solution in water has a significantly higher energy requirement (steam amount) for regeneration compared with a bisDMAPA/piperazine mixture.

Thus, although an aqueous MEA solution would have a very high absorption rate, it would likewise have a very high energy requirement in regeneration. Vice versa, an aqueous bisDMAPA solution would have only an inadequately low absorption rate which, on conversion to an industrial scale, would require a significantly larger absorber column. Examples 1 and 2 verify that by using a corresponding mixture, surprisingly a highly balanced absorption medium is obtained which not only has a high absorption rate but also requires very low energy demand for regeneration.

In addition, in the experiments, the effect due to addition of activated carbon was also studied. For this purpose a mixture of 15% by weight BisDMAPA and 15% by weight of piperazine was additionally admixed with 0.1% of activated carbon (Norit SA Super, BET surface area 1150 m²/g) and the relative absorption rate was determined in a similar manner to the other examples. Compared with the mixture of 15% by weight of BisDMAPA and 15% by weight of piperazine without activated carbon, the relative absorption rate increases in the presence of only 0.1% by weight of activated carbon at a loading of 10 m³ (S.T.P.) of $CO_2$ per t of absorption medium from 269% to 396% and at a loading of 20 m³ (S.T.P.) of $CO_2$ per t of absorption medium of from 366% to 636%. The results therefore show a further significant increase of the relative absorption rate due to the presence of activated carbon.

TABLE 1

Relative cycle capacity and steam requirement normalized to MEA

| Absorption medium [% in % by weight] | m[oligoamine (A)]/ m[activator (B)] | {m[oligoamine (A)] + m[activator (B)]}/m[water] | Concentration of amines based on the total amount [% by weight] | Relative cycle capacity [%] | Relative steam requirement [%] |
|---|---|---|---|---|---|
| 30% MEA | — | — | 30 | 100 | 100 |
| 15% BisDMAPA + 15% Pip | 1 | 0.43 | 30 | 128 | 68 |

MEA = monoethanolamine
BisDMAPA = bis(3-dimethylaminopropyl)amine
Pip = piperazine

TABLE 2

Relative absorption rate of various absorption media at a loading with 10 and 20 m³ (S.T.P.) of $CO_2$/t normalized to bisDMAPA

| Absorption medium [% in % by weight] | m[oligoamine (A)]/ m[activator (B)] | {m[oligoamine (A)] + m[activator (B)]}/m[water] | Concentration of amines based on the total amount [% by weight] | Relative absorption rate at a loading of 10 m³ (S.T.P.) of $CO_2$ per t of absorption medium [%] | Relative absorption rate at a loading of 20 m³ (S.T.P.) of $CO_2$ per t of absorption medium [%] |
|---|---|---|---|---|---|
| 31.2% MEA | — | — | 31.2 | 378 | 541 |
| 20% BisDMAPA + 10% Pip | 2 | 0.43 | 30 | 229 | 307 |
| 15% BisDMAPA + 15% Pip | 1 | 0.43 | 30 | 269 | 366 |
| 30% BisDMAPA | — | — | 30 | 100 | 100 |
| 28.6% BisDMAPA + 1.4% Pip | 20.4 | 0.43 | 30 | 145 | 182 |
| 15% BisDMAPA + 15% Pip + 0.1% AC | 1 | 0.43 | 30 | 396 | 636 |

MEA = monoethanolamine
BisDMAPA = bis(3-dimethylaminopropyl)amine
Pip = piperazine
AC = activated carbon (Norit SA Super)

The invention claimed is:

1. An absorption medium for acid gases which comprises (A) an oligoamine of the general formula (I)

in which
R$^1$ is C$_1$- to C$_3$-alkyl,
R$^2$ is hydrogen or C$_1$- to C$_3$-alkyl,
n is 2 to 6, and
p is 1 to 3; and
(B) a piperazine derivative of the general formula (II)

in which
R$^a$ is hydrogen, C$_1$- to C$_3$-alkyl, —CH$_2$CH$_2$OH or —(CH$_2$)$_m$NH$_2$ where
m is 1 to 3, and
R$^b$ is hydrogen, C$_1$- to C$_3$-alkyl or —(CH$_2$)$_n$NH$_2$ where n is 1 to 3,
R$^c$ is hydrogen, C$_1$- to C$_3$-alkyl or —(CH$_2$)$_o$NH$_2$ where o is 1 to 3,
R$^d$ is hydrogen, C$_1$- to C$_3$-alkyl or —(CH$_2$)$_p$NH$_2$ where p is 1 to 3, and
R$^e$ is hydrogen, C$_1$- to C$_3$-alkyl or —(CH$_2$)$_q$NH$_2$ where q is 1 to 3,
wherein the weight ratio of oligoamine (A) to the piperazine derivative (B)

m[oligoamine (A)]/m[piperazine derivative (B)]

is 0.2 to 4.

2. The absorption medium for acid gases according to claim 1, in which the concentration of oligoamine (A) plus piperazine derivative (B) is 10 to 60% by weight, based on the total amount of the absorption medium.

3. The absorption medium for acid gases according to claim 1, in which the concentration of oligoamine (A) is between 1 and 20% by weight, based on the total amount of the absorption medium.

4. The absorption medium for acid gases according to claim 1, in which the oligoamine (A) is bis(3-dimethylaminopropyl)amine.

5. The absorption medium for acid gases according to claim 1, in which the piperazine derivative (B) is piperazine.

6. The absorption medium for acid gases according to claim 1, further comprising water, wherein the weight ratio of the sum of oligoamine (A) plus piperazine derivative (B) to water {m[oligoamine (A)]+m[piperazine derivative (B)]}/m[water]

is 0.11 to 1.5.

7. A process for removing acid gases from a gas stream by contacting the gas stream at a pressure of 0.05 to 10 MPa abs with a liquid absorption medium which is brought to and maintained at a temperature of 20 to 80° C., which comprises using as liquid absorption medium an absorption medium for acid gases according to claim 6.

8. The process according to claim 7, wherein the acid gas is removed in a scrubbing column operated in countercurrent flow, in which, in the interior, a discontinuous liquid phase forms, in the presence of activated carbon that is present in the interior of the scrubbing column.

9. The process according to claim 7, wherein biogas or flue gas is contacted with the liquid absorption medium at a pressure of 0.05 to 0.5 MPa abs.

10. The process according to claim 7, wherein the gas stream comprises 0.1 to 21% by volume of oxygen.

11. The process according to claim 7, wherein the acid gas comprises carbon dioxide and the carbon dioxide concentration in the gas stream is 0.1 to 50% by volume.

12. The process according to claim 7, wherein the absorption medium which is loaded with carbon dioxide after being contacted with the gas stream is regenerated by heating, by expansion, by stripping with an inert fluid, or a combination of two or all three of said measures.

13. The absorption medium for acid gases according to claim 2, in which the concentration of oligoamine (A) is between 1 and 20% by weight, based on the total amount of the absorption medium.

14. The absorption medium for acid gases according to claim 2, in which the oligoamine (A) is bis(3-dimethylaminopropyl)amine.

15. The absorption medium for acid gases according to claim 3, in which the oligoamine (A) is bis(3-dimethylaminopropyl)amine.

* * * * *